A. S. FREEMAN.
GAS GENERATOR.
APPLICATION FILED DEC. 23, 1911.
1,034,702.
Patented Aug. 6, 1912.
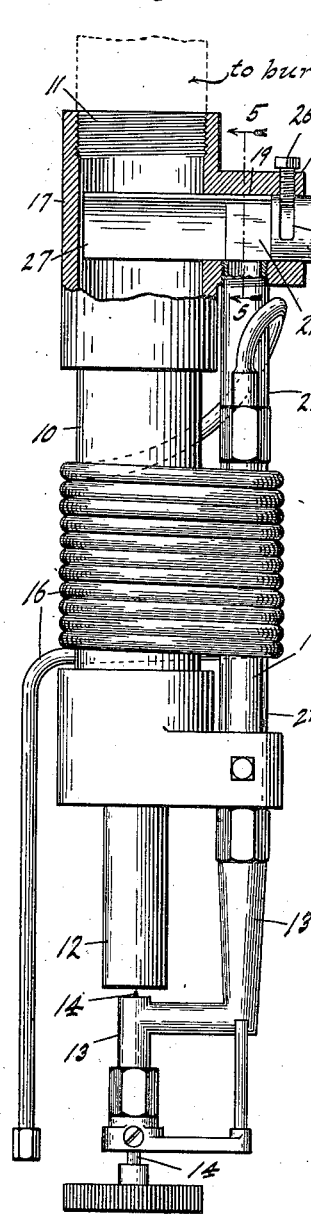
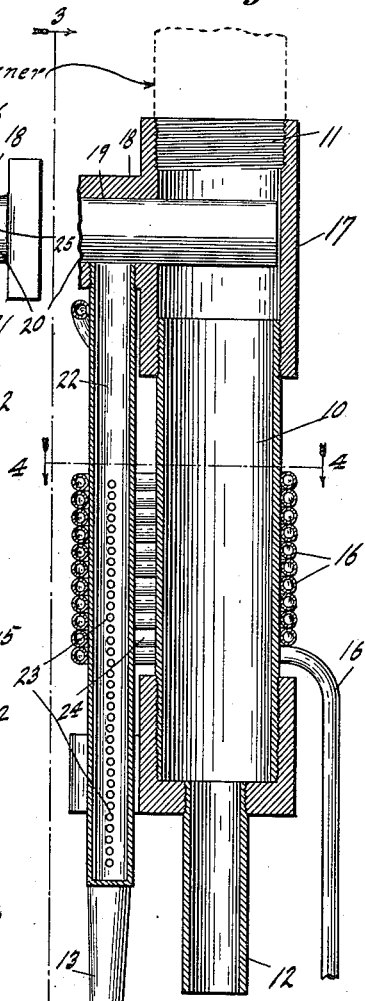
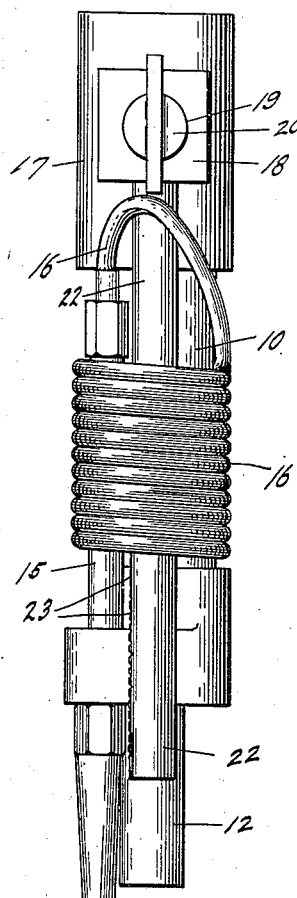
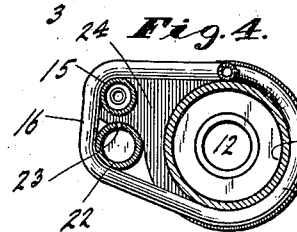
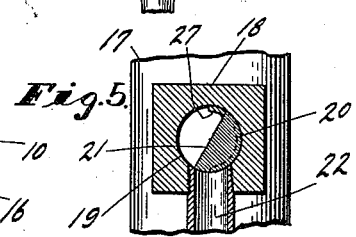
Witnesses
Frank A. Fahl
May Layden
Inventor
Albert S. Freeman,
by Arthur M. Hood
Attorney

UNITED STATES PATENT OFFICE.

ALBERT S. FREEMAN, OF ALEXANDRIA, INDIANA, ASSIGNOR TO FREEMAN MANUFACTURING COMPANY, OF ALEXANDRIA, INDIANA, A CORPORATION OF INDIANA.

GAS-GENERATOR.

1,034,702.

Specification of Letters Patent. Patented Aug. 6, 1912.

Application filed December 23, 1911. Serial No. 667,538.

*To all whom it may concern:*

Be it known that I, ALBERT S. FREEMAN, a citizen of the United States, residing at Alexandria, in the county of Madison and State of Indiana, have invented a new and useful Gas-Generator, of which the following is a specification.

The object of my invention is to produce a compact and highly efficient gas generator by means of which a liquid fuel, such as gasolene, may be vaporized and mixed with air and in such condition as to produce an efficient combustible gas.

The accompanying drawings illustrate my invention.

Figure 1 is an elevation partly in section of a generator embodying my improvement; Fig. 2 an axial section; Fig. 3 an elevation on line 3—3 of Fig. 2; Fig. 4 a section on line 4—4 of Fig. 2; Fig. 5 a section on line 5—5 of Fig. 1.

In the drawings, 10 indicates a tubular mixing chamber provided at its discharge end with threads 11 by means of which it may be connected to a pipe, indicated in dotted lines, leading to any desired burner nozzle. The receiving end of tube 10 is provided with a smaller tip or nipple 12 into the receiving end of which is directed a discharge nozzle 13 provided with an ordinary needle valve 14. Nozzle 13 is connected to the discharge end of a superheating tube 15, the receiving end of which is connected to a fuel pipe or tube 16 coiled to form a vaporizer.

The discharge end of chamber 10 is preferably in the form of a hollow fitting 17 provided with a lateral extension 18 bored to form a passage 19 in which is mounted a rotatable valve 20, said valve having a portion 21 adapted to control the intake end of a tube 22 which is arranged substantially parallel with tube 10 and the superheating chamber 15.

Pipe or tube 16 is of such length that it may be wrapped several times around tubes 10, 15, and 22, and the tube 22 is provided with a multiplicity of small openings 23, preferably directed toward the tube 15 and through which gas may be ejected and lighted within the space 24 formed between the three substantially parallel tubes and the encircling wrappings of tube 16. The burner nozzle tube 22 is preferably extended beyond the turns of tube 16 and provided with perforations 23 in this extension so that a plurality of small flames may be projected against the superheating tube 15 practically throughout its length. Valve 20 is held in place by any suitable means, such for instance, as a circumferential slot 25 and screw 26, and this valve is provided at its inner end with a deflector 27 which projects substantially diametrically across the discharge end of the mixing chamber 10 within the fitting 17, the arrangement being such that, when the portion 21 of the valve closes the intake end of tube 22, as shown in Fig. 5, the deflector 27 (dotted lines, Fig. 5) will offer the minimum obstruction to the flow of the mixture through chamber 10 and, as the portion 21 is gradually retracted so as to open the intake end of tube 22 more and more, the deflector 27 will progressively obstruct the flow of gas through the mixing chamber so as to deflect more and more of that mixture toward the burner tube 22.

In operation tube 16 will be initially heated so as to vaporize the gasolene, and valve 21 will be so adjusted as to deflect into tube 22 a portion of the mixture passing through chamber 10, and this portion of the mixture will issue through the perforations 23 so that it may be lighted in a multiplicity of small flame jets which will be directed toward the superheater tube 15 and nozzle 13. A material number of these flame jets will issue into the chamber or space 24 so that walls forming this chamber (*i. e.*, the adjacent portions of tubes 10, 15, 16 and 22) will become very highly heated, the liquid fuel in tube 16 being first heated and then volatilized within tube 16; highly superheated in the superheating chamber 15, the mixture of vapor and air within chamber 10 also highly heated, and the portion of mixture within tube 22 being also further heated, thus insuring a hot highly efficient inflammable mixture delivered from the apparatus. By this arrangement also the tube 16, which is comparatively small in diameter, is stiffened by its wrapping around the other members, and, because of its compact arrangement, is thoroughly protected against injury.

I claim as my invention:

1. A gas generator comprising a mixing chamber having a main discharge outlet, a burner nozzle arranged adjacent the mixing chamber and communicating therewith, a fuel nozzle directed into the mixing chamber, a fuel pipe wrapped around the mixing chamber and burner nozzle to form a chamber into which flames from the burner nozzle may be projected, a superheating chamber through the medium of which said fuel pipe is connected to the fuel nozzle, said superheating chamber also lying within the coils of the fuel pipe, a valve controlling the inlet end of the burner nozzle, and a deflector carried by said valve and projected into the mixing chamber.

2. A gas generator comprising a mixing chamber having a main discharge outlet, a burner nozzle arranged adjacent the mixing chamber and communicating therewith, a fuel nozzle directed into the mixing chamber, a fuel pipe wrapped around the mixing chamber and burner nozzle to form a chamber into which flames from the burner nozzle may be projected, and a superheating chamber through the medium of which said fuel pipe is connected to the fuel nozzle, said superheating chamber also lying within the coils of the fuel pipe.

3. A gas generator comprising a mixing chamber having a main discharge outlet, a burner nozzle arranged adjacent the mixing chamber and communicating therewith, a fuel nozzle directed into the mixing chamber, a fuel pipe wrapped around the mixing chamber and burner nozzle to form a chamber into which flames from the burner nozzle may be projected, said fuel pipe having communication with the fuel nozzle, a valve controlling the inlet end of the burner nozzle, and a deflector carried by said valve and projected into the mixing chamber.

4. A gas generator comprising a mixing chamber having a main discharge outlet, a burner nozzle arranged adjacent and substantially parallel to the mixing chamber and communicating therewith, means for shunting part of the mixture to the burner nozzle, a fuel nozzle directed into the mixing chamber, and a fuel pipe wrapped a plurality of times around the mixing chamber and burner nozzle to form a chamber into which flames from the burner nozzle may be projected, said fuel pipe having communication with the fuel nozzle.

5. A gas generator comprising a mixing chamber having a main discharge outlet and an auxiliary discharge outlet, a burner nozzle supplied from said auxiliary discharge outlet and arranged adjacent to mixing chamber, a fuel nozzle directed into the mixing chamber, a valve controlling the inlet end of the burner nozzle, and a deflector carried by said valve and projected into the mixing chamber.

In witness whereof, I, have hereunto set my hand and seal at Indianapolis, Indiana, this 21st day of December, A. D. one thousand nine hundred and eleven.

ALBERT S. FREEMAN. [L. S.]

Witnesses:
G. B. SCHLEY,
FRANK A. FAHLE.

Copies of this patent may be obtained for five cents each, by addressing the "Commissioner of Patents, Washington, D. C."